3,812,028
HYDROTREATMENT OF FOSSIL FUELS
Arnold N. Wennerberg, Chicago, and Alvin W. Frazier, Chicago Heights, Ill., assignors to Standard Oil Company, Chicago, Ill.
Continuation-in-part of application Ser. No. 144,472, May 18, 1971, now Patent No. 3,715,303, dated Feb. 6, 1972. This application Feb. 5, 1973, Ser. No. 329,877
Int. Cl. C10g 13/06, 37/06; B10j 11/06
U.S. Cl. 208—112                                                19 Claims

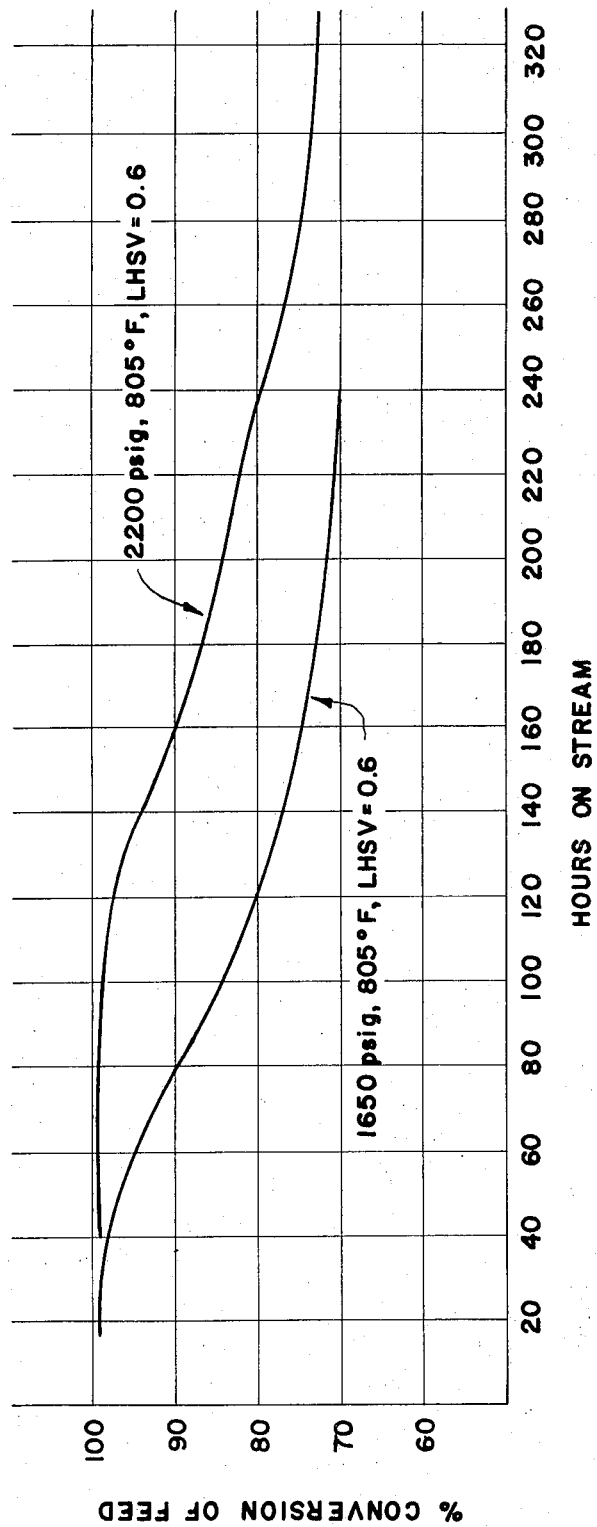

ABSTRACT OF THE DISCLOSURE

Fossil fuels containing polynuclear aromatics are hydrotreated at hydrogen partial pressures in excess of 2200 p.s.i.g. by passing such a fossil fuel through a zone maintained at elevated temperatures and including a catalyst comprising activated carbon and a metallic component.

RELATED APPLICATIONS

This application is a continuation-in-part application of our copending application U.S. Ser. No. 144,472, entitled Hydrotreatment of Fossil Fuels, filed May 18, 1971 issued Feb. 6, 1972 as U.S. Pat. 3,715,303.

BACKGROUND

In our co-pending application U.S. Ser. No. 144,472, incorporated herein by reference, we discovered a new process for hydrotreating fossil fuels containing polynuclear aromatics such as asphaltenes. Such hydrotreatment converts high boiling feeds to lower boiling hydrocarbons. Feeds in this process can be such fossil fuels as shale oil, tar sands, coal, coal derived oil or extracts, resid hydrocarbon or the like. The key to our hydrotreating process is a carbon-based catalyst. Such catalysts include an alkali metal component or an alkaline earth metal component or both, and they may also include a hydrogenation metal component such as metal components in Groups VI and VIII of the Periodic Table, such as nickel, chromium, tungsten, cobalt, molybdenum, iron, or their oxides or sulfides. The product from our process may be fed directly to a fixed bed or fluidized catalytic cracking unit, in contrast to products from conventional processes which are usually black and are unsuitable feeds to catalytic cracking units.

THE INVENTION

In accordance with our present invention, a feed containing polynuclear aromatics is fed through a zone maintained at an elevated temperature and at a hydrogen partial pressure in excess of 2200 p.s.i.g., said zone containing a catalyst comprising activated carbon and a metallic component.

The preferred conditions of our process are as follows:

Temperature: 750–850° F. (optimum 790–810° F.)
Hydrogen partial pressure: 2200–4000 p.s.i.g. (optimum about 3000 p.s.i.g.)
$H_2$ flow rate: 4000–40,000 s.c.ft. of H/bbl. of feed
Space velocity: 0.3–5.0 volumes of feed per volume of catalyst per hour Based on experimentation, we now know that the process disclosed in our aforementioned patent application is substantially improved when conducted at hydrogen partial pressures in excess of 2200 p.s.i.g. At hydrogen partial pressures below 2200 p.s.i.g., the catalyst rapidly becomes deactivated. Surprisingly, when our process is conducted at temperatures in the range of 750° to 850° F. the activity of the catalyst can be restored by terminating flow of feed over the catalyst, but continuing to feed hydrogen over the catalyst. Usually catalyst used to hydroprocess resids become irreversably deactivated. This is not the case when a carbon/metal catalyst is used in our process.

The figure shows two curves where percent conversion of feed is plotted against hours the feed was on stream. These curves represent a resid hydrocarbon feed being converted to a lower boiling product by passing the feed over a carbon/metallic catalyst at elevated temperatures and pressures. The only difference in reaction conditions is the hydrogen partial pressure. Note, that as hydrogen partial pressure increases, the catalyst remains for a longer time at higher activity. Present data indicate that to achieve steady state conditions the hydrogen partial pressure must exceed 2200 p.s.i.g., preferably about 3000 p.s.i.g.

During our experiments, we have observed a high temperature band in the reactor. Initially, this band was at the top of the reactor where the feed and hydrogen are entering the reactor. As the time the feed remains on stream increases, the band moves down the reactor toward the reactor bottom. As hydrogen partial pressure increases, the band moves more slowly, and as the hydrogen partial pressure approaches and exceeds 2200 p.s.i.g., the band will cease to travel. This further reinforces our opinion that steady state conditions prevail. In terms of process economics, this means high space velocities can be realized by employing reactor systems adapted to initially pass the feed through a relatively shallow increment of catalyst. Hence, a fluidized catalyst bed, such as illustrated in our co-pending application U.S. Ser. No. 144,472, would be suitable, or specially designated shallow fixed bed reactors.

The preferred catalyst include activated carbon having a surface area in the range of from 200 to about 2500 square meters per gram and about 0.1 to about 50 wt. percent of a metallic component based on weight of the carbon. The metallic component may be hydrogenation metals from Group VI and/or VIII or their oxides or sulfides, mixtures of such hydrogenation metals or their oxides or sulfides, or mixtures of such hydrogenation metals or their oxides or sulfides and alkali metal components or alkaline earth metal components. In some instances we have found the sulfide form of the metal preferable.

PREPARATION

Catalyst were prepared by a two step technique for impregnation of the specified active carbon. The two commercially available active carbons employed were supplied by Pittsburgh Active Carbon Co. Their specifications are:

|  | SGL | Rb |
|---|---|---|
| Total surface area (B.E.T.). | 950–1,050 | 1,250–1,400. |
| Apparent density, g./cc. | 0.48 | 0.41. |
| Pore volume, cc./g. | 0.85 | 1.22. |
| Mesh size (used) | Thru 14 on 32 mesh | Thru 20 on 32 mesh. |
| Ash, wt. percent | 8.0 | 23. |
| Abrasion No., minimum | 70 | |
| Pore size, diameter | 10–500+ | 20–500+. |

The following reproducible procedure for catalyst preparation describes the technique and sequence for all two stage preparations involving at least two dissimilar metal ions or metal oxide components dispersed on the specified active carbon. Where only a single metal, metal salt, or metal oxide is indicated, it was prepared by the 1st of two steps used in this general procedure.

Procedure.—Step I: A suitable, generally water-soluble form of metal ion (unless otherwise indicated) was dissolved in distilled water. The resultant solution was combined with a specified weight of active carbon in a 500 ml. resin kettle equipped for evacuation through a Rinco evaporator. In all cases wetting by solutions caused varying amounts of degassing characterized by vigorous effervescence. When degassing was complete at room temperature, 25° C., with thorough mixing, the resin kettle and contents were connected to a Rinco evaporator which was connected in turn to knock out traps and a vacuum pump. The vacuum train included suitable bleed control valves and a manometer to indicate internal pressure during evacuation-evaporation. Step I included in sequence:

Evaporation (water bath) 25° C.–100° C. at 5–100 mm. Hg

Evaporation, chemical change (if any) silicone oil bath, 100° C.–220° C. at 5–20 mm. Hg In all cases the resin kettle immersed in the heating bath was rotated to provide continuous and uniform heat exchange (and rate of evaporation) to the slurry and/or fluidized solid contents in the resin kettle. At the end of Step I the internal pressure of the system was restored to atmospheric pressure by "bleeding" dry Argon (Ar) gas into the system.

Unless otherwise indicated, step II repeated the sequence of step I following interaction of the product of Step I with the second of two metal ion (metal salt, metal hydroxide, water-soluble metal ion complex). Any activation or stabilization treatment on the product of step II is indicated as a preliminary to charging the standard volume, 42 ml. of catalyst to a down flow, fixed bed reactor.

Several catalysts were treated. Their effectiveness is indicated by an activity rating under specified conditions such that a rating of 1 is equivalent to 13.5 hours on stream with an activity sufficient to convert 90% of the components of a standard atmospheric resid boiling above 1000° F. to products boiling below 1000° F. The following catalysts were prepared according to the above preparation and then initially evaluated as indicated under the following conditions and using the following feed.

Operating conditions for hydroconversion

| | | |
|---|---|---|
| Pressure | p.s.i.g. | 1650 |
| Temperature | °F. | 800 |
| LHSV | | 0.8 |
| $H_2$ throughput, 2 s.c.f./hour | s.c.f./bbl. | 20,000 |
| Catalyst bed volume | ml. | 42.0 |

Feed flow, down flow.

Standard feed characteristics

| | |
|---|---|
| Fractionation: | |
| Naphtha | 0.0 |
| Kerosene | 4.1 |
| LGO | 12.6 |
| VGO | 38.8 |
| Resid | 43.4 |
| Percent S | 3.25 |
| Percent boiling above 1000° F. | 43.4 |
| Oil | 51.21 |
| Resin | 45.18 |
| Asphaltene | 3.49 |
| °API, 60° F. | 15.4 |
| Pour point | 80/0 |
| Ramsbottom C | 8.4 |
| Metals, p.p.m.: | |
| Ni | 16 |
| V | 25 |

| Catalyst formulate: | Activity |
|---|---|
| (1) 10% MgO+20% $Cr_2O_3$ on 70% Rb carbon | 5.0–5.5 |
| (2) 10% NiO+15% $NaH_2PO_4$ on 75% Rb carbon | 4.0 |
| (3) 10% NiO+20% $Cr_2O_3$ on 70% Rb carbon | 5.5–6.0 |
| (4) 20% $H_3PW_{12}O_{40}$ on 80% Rb carbon | 5.0 |
| (5) 20% SrO on 80% Rb carbon | 5.0 |
| (6) 5% $Cr_2O_3$+5% $K_2MoO_4$ on 90% SGL carbon | 4.0 |
| (7) 10% $Cr_2O_3$ on 90% Rb carbon | 4.5 |
| (8) 5% ZnO+10% $Cr_2O_3$ on 85% SGL carbon | 3.0 |
| (9) 10% $Cr_2O_3$+5% $TiO_2$ on 85% Rb carbon | 3.0 |

The following is an example of the most preferred catalyst.

10% NiO–20% $Cr_2O_3$ on Pittsburgh Rb carbon

EXAMPLE I

Procedure I

Step I.—To 70 g. of granular active carbon in a 500 ml. resin kettle was charged a solution of 33.2 g.

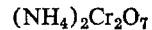
$(NH_4)_2Cr_2O_7$ dissolved in 100 g. of $H_2O$ at 80° C. The hot solution when added to the active carbon caused considerable efferverscence by degassing the granular active carbon through wetting and adsorption. A 35° C.–50° C. temperature rise was observed as a heat of adsorption as the entire mixture-slurry of active carbon was thoroughly mixed by stirring. When efferverscence subsided the resin kettle was connected to a Rinco evaporator which in turn was connected to a sequence of wet ice and Dry Ice traps and a vacuum pump. The resin kettle and contents were then immersed in a water bath which was heated from 30° C. to 100° C. at 10–18 mm. Hg with the kettle rotating in the hot water bath. At 100° C. the system was transferred to a silicone oil bath preheated to 100° C. and heating was continued to 220° C. at a vacuum corresponding to 5 mm. Hg. After the peak temperature was reached the intermediate, impregnated carbon corresponded to $Cr_2O_3XH_2O$ on Rb active carbon. The hot oil bath was removed and the entire system was cooled to room temperature with rotation under vacuum at 5–10 mm. Hg.

Step II.—The system under vacuum from step I above was pressured to atmospheric pressure by bleeding Ar (dry) into the system. At this point a solution containing 23.6 g. $Ni(C_2H_3O_2)_2$ dissolved in 160 g. $H_2O$ heated to 50° C. was added to the impregnated granular active carbon of step I. The resultant slurry was thoroughly mixed and the system was reconnected to a vacuum system consisting of traps (as in step I) to a vacuum pump. While rotating the initial vacuum was regulated to control an excessive rate of evaporation. When the interstitial water level was sufficiently reduced, vacuum was increased to 5–10 mm. Hg and the system was arranged to have the resin kettle immersed in a water bath at 50° C. (initial temperature). The water bath was then progressively heated to 100° C. at which temperature the system was transferred to a silicone oil bath preheated to 100° C. Heating was continued through the temperature range 100° C.–220° C. over a period of 2 hours at minimum pressure (vacuum) of 5 mm. Hg. At this point the oil bath was removed and the resin kettle and contents were continued rotating under vacuum to allow cooling to room temperature. The system was then pressured to atmospheric pressure by a dry Ar bleed and the contents were stored in a sealed jar under Ar blanket.

The product of stages I and II above had an estimated composition of 10% NiO+20% $Cr_2O_3$ on 70% Rb active carbon.

Estimated analysis (percent): Ni, 7.85; Cr, 13.7; C, 70.0; O by diff.=8.45. Found (percent): Ni, 7.82; Cr, 13.55; C, 69.8; O by diff.=8.83.

Procedure II

An alternate procedure for steps I and II above were employed where the maximum drying temperature for step II was 100° C. at 5 mm. Hg and for step II, 250° C. at 5 mm. Hg pressure.

Product of procedure II, stages I and II were estimated to be 10% NiO+20% $Cr_2O_3$ or 70% (Rb) carbon.

Estimated analysis (percent): Ni, 7.85; Cr, 13.70; C, 70.0. Found (percent): Ni, 7.78; Cr, 13.59; C, 68.8.

SULFIDING THE CATALYST

Before being used as a catalyst for resid hydroconversion each catalyst form was presulfided under the following sulfiding sequence.

Sulfided in reactor as fixed bed by flow of gas (8% $H_2S$+92% H) at 100° C. for 8 hours. A significantly more active and stable catalyst may be obtained by presulfiding according to the following time-temperature program with 8% $H_2S$+92% $H_2$.

(a) 6–8 hours at 212° F.  (c) 2–5 hours at 400° F.
(b) 2–5 hours at 300° F.  (d) 2–5 hours at 500° F.

Following presulfiding and reduction, the catalyst was kept free of air or oxygen preferably under a blanket of $H_2$ or under $H_2$ flow. This step may be conveniently timed to allow start of the hydroconversion reaction immediately following completion of reduction and presulfiding.

Catalyst: 10% NiO+20% $Cr_2O_3$ on Pittsburgh Rb active carbon (sulfided)

Comparison of feed and products of hydroconversion with the above catalyst.

Operating conditions:

| | |
|---|---|
| Pressure, p.s.i.g. | 2200 |
| Temperature ° F | 790–800 |
| LHSV | 0.6 |
| $H_2$ throughput, 2 s.c.f./hour s.c.f./bbl | 20,000 |
| Hours on stream | 120 |

COMPARATIVE PROPERTIES OF REACTANT AND PRODUCTS

| | Feed | Products |
|---|---|---|
| Fractions: | | |
| Naphtha | | 10.9 |
| Kerosene | 4.1 | 11.78 |
| LGO | 12.6 | 32.23 |
| VGO | 38.8 | 38.4 |
| Resid | 43.4 | 6.78 |
| Percent S | 3.25 | 0.32 |
| $C_1$–$C_5$ | | 5.0 |
| Oil | 51.32 | 63.9 |
| Resin | 45.18 | 31.0 |
| Asphaltene | 3.49 | 0.1 |
| ° API, 60° F | 25.4 | 23 |
| Pour point | 80/0 | 50/0 |
| Ramsbottom C | 8.4 | 0.72 |
| Metals: | | |
| Ni | 16 | 0.5–1.0 |
| V | 25 | 1.0–1.0 |

CRACKING EVALUATION OF PRODUCT VGO

| Conversion | Crackability [1] | Coke (wt. percent) |
|---|---|---|
| 78 | 130 | 5.3 |

[1] Crackability, relative to wide boiling high sulfur VGO taken as 100 or 103 relative to Midcontinent VGO taken as 100.

We claim:

1. A process for hydrotreating a feed containing polynuclear aromatics including the step of passing said feed through a zone maintained at an elevated temperature and at a hydrogen partial pressure in excess of 2200 p.s.i.g., said zone containing a catalyst comprising activated carbon and a metallic component.

2. The process of claim 1 wherein the hydrogen partial pressure is in the range of from 2200 to 4000 p.s.i.g., the temperature is between 750° and 850° F., and the feed passes through said zone at a space velocity in excess of 0.3 volumes of feed per volume of catalyst per hour.

3. The process of claim 2 wherein the space velocity is in the range of from 0.3 to 5 volumes of feed per volume of catalyst per hour.

4. The process of claim 2 wherein the hydrogen throughput is from 4,000 to 40,000 standard cubic feet of hydrogen feed.

5. The process of claim 1 wherein the feed is a resid hydrocarbon including from about 0.1 to about 30 wt. percent asphaltenes.

6. The process of claim 1 wherein feed flow over the catalyst is terminated but hydrogen flow over the catalyst is continued to reactivate said catalyst.

7. The process of claim 1 wherein the polynuclear aromatics are part of a fossil fuel selected from the group consisting of tar sand, shale oil, coal, and coal derived oils or extracts.

8. The process of claim 1 wherein the activated carbon has a surface area from 200 to 2,500 square meters per gram of carbon and the metallic component comprises from 0.1 to 50 wt. percent of the catalyst based on carbon weight.

9. The process of claim 8 where the metallic component is a mixture of the oxides or sulfides of nickel and chromium.

10. The process of claim 8 wherein the metallic component is a mixture of the oxides or sulfides of sodium and nickel.

11. The process of claim 8 wherein the metallic component comprises a mixture of the oxides or sulfides of magnesium and chromium.

12. The process of claim 8 wherein the metallic component comprises a mixture of the oxide or sulfides of zinc and chromium.

13. The process of claim 8 wherein the metallic component is a mixture of the oxides or sulfides of molybdenum and chromium.

14. The process of claim 8 wherein the metallic component is the oxide or sulfide of chromium.

15. The process of claim 8 wherein the metallic component is the oxide or sulfide of strontium.

16. The process of claim 8 wherein the metallic component is the oxide or sulfide of tungsten.

17. The process of claim 8 wherein the metallic component is a mixture of the oxides or sulfides of titanium and chromium.

18. In a process for hydrotreating a feed containing hydrocarbons including from about 0.1 to about 30 wt. percent asphaltenes based on the weight of the hydrocarbon, the step of contacting said feed at a temperature of from about 750° to about 850° F., a hydrogen partial pressure of from about 2200 to 4000 p.s.i.g., a feed rate of from about 0.3 to about 5 volumes of feed per volume of catalyst per hour, and hydrogen throughput of from about 4,000 to about 40,000 standard cubic feet of hydrogen per barrel of feed, and a shallow increment of catalyst comprising an activated carbon having a surface area in the range of from about 200 to about 2,500 square meters per gram of carbon, and from about 0.1 to about 50 wt. percent of a metallic component based on the weight of carbon.

19. The process of claim 8 wherein the feed flow over the catalyst is terminated but hydrogen flow over the catalyst is continued to reactivate said catalyst.

References Cited

UNITED STATES PATENTS

| | | | |
|---|---|---|---|
| 3,530,194 | 9/1970 | Quik et al. | 260—672 R |
| 3,546,103 | 12/1970 | Hamner et al. | 208—211 |
| 3,725,244 | 4/1973 | Schutt | 208—59 |

DELBERT E. GANTZ, Primary Examiner

G. E. SCHMITKONS, Assistant Examiner

U.S. Cl. X.R.

208—61, 216; 252—447, 468

UNITED STATES PATENT OFFICE
CERTIFICATE OF CORRECTION

PATENT NO. : 3,812,028
DATED : May 21, 1974
INVENTOR(S) : Arnold N. Wennerberg and Alvin W. Frazier It is certified that error appears in the above-identified patent and that said Letters Patent are hereby corrected as shown below:

| Column 1, line 34, | "oil" should be -- oils --. |
| " 2 " 30, | "designated" should be -- designed --; |
| " 2, " 46, | "Catalyst" should be -- Catalysts --. |
| " 3, " 43, | "$H_2$ throughput, 2 s.c.f./hour ------ s.c.f./bbl-- 20,000" should be -- $H_2$ throughput 2 SCF/hour; 20,000 SCF/bbl. --; |
| " 3, " 65, | "formulate" should be -- Formulation --. |
| " 4, " 35, | "the intermediate," should be -- , the intermediate --; |
| " 4, " 74, | "step II was" should be -- Step I was --. |
| " 5, " 8, | "each" should be -- , each --; |
| " 5, " 33, | "$H_2$ throughput, 2 s.c.f./hour --s.c.f./bbl-- 20,000" should be -- $H_2$ Throughput 2 SCF/hour; 20,000 SCF/bbl. --. |
| " 6, " 29, | "oxide" should be -- oxides --. |

Signed and Sealed this twenty-second Day of June 1976

[SEAL]

Attest:

RUTH C. MASON
Attesting Officer

C. MARSHALL DANN
Commissioner of Patents and Trademarks